(12) United States Patent
Gevargis

(10) Patent No.: US 12,375,414 B2
(45) Date of Patent: *Jul. 29, 2025

(54) INTELLIGENT ROUTER BONDING 5G TELEPHONY AND DIGITAL SUBSCRIBER LINE SERVICES

(71) Applicant: DISH Wireless L.L.C., Englewood, CO (US)

(72) Inventor: George Gevargis, Littleton, CO (US)

(73) Assignee: DISH Wireless L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/404,442

(22) Filed: Jan. 4, 2024

(65) Prior Publication Data

US 2024/0154913 A1    May 9, 2024

Related U.S. Application Data

(63) Continuation of application No. 17/126,931, filed on Dec. 18, 2020, now Pat. No. 11,936,566.

(51) Int. Cl.
| | |
|---|---|
| H04L 47/2491 | (2022.01) |
| H04L 12/28 | (2006.01) |
| H04L 41/0896 | (2022.01) |
| H04L 45/125 | (2022.01) |

(52) U.S. Cl.
CPC ...... *H04L 47/2491* (2013.01); *H04L 12/2856* (2013.01); *H04L 41/0896* (2013.01); *H04L 45/125* (2013.01)

(58) Field of Classification Search
None
See application file for complete search history.

(56) References Cited

U.S. PATENT DOCUMENTS

| | | | |
|---|---|---|---|
| 6,061,089 A | 5/2000 | Tonkin et al. | |
| 6,621,795 B1 * | 9/2003 | Redi | H04W 36/06 370/235 |
| 7,133,391 B2 * | 11/2006 | Belcea | H04W 52/50 370/347 |
| 10,135,896 B1 * | 11/2018 | Tiwary | H04L 65/80 |
| 10,602,560 B2 * | 3/2020 | Skog | H04L 67/14 |
| 10,999,210 B2 * | 5/2021 | Chen | H04L 45/745 |
| 11,102,077 B2 * | 8/2021 | Clark | H04L 41/122 |
| 11,171,900 B1 * | 11/2021 | Kao | H04L 67/53 |
| 11,290,916 B1 * | 3/2022 | Malas | H04W 28/0831 |

(Continued)

*Primary Examiner* — Mariela Vidal Carpio
(74) *Attorney, Agent, or Firm* — KW Law, LLP

(57) ABSTRACT

A hybrid 5G/DSL service provides an on-premises router device that monitors both wireless and wired data connections to provide optimized service using both connections. A 5G/DSL router can make use of "always available" bandwidth of a DSL connection to avoid overuse of more limited wireless bandwidth while augmenting and/or substituting with wireless bandwidth as needed. A hybrid 5G/DSL service may be especially convenient for rural customers who may not have access to fiber or cable-based data services. Moreover, the 5G/DSL hybrid service may provide a cost effective option for customers who simply want to augment DSL service in limited situations (e.g., for occasional media streaming) rather than paying for "always-available" higher bandwidth connections that remain largely underutilized much of the time.

20 Claims, 2 Drawing Sheets

(56) References Cited

U.S. PATENT DOCUMENTS

| | | | | |
|---|---|---|---|---|
| 11,533,237 B2* | 12/2022 | Beran | | H04L 65/65 |
| 2010/0191862 A1* | 7/2010 | Forbes, Jr. | | G06Q 10/00 |
| | | | | 709/240 |
| 2010/0271950 A1* | 10/2010 | Dominguez Romero | | |
| | | | | H04L 45/125 |
| | | | | 370/252 |
| 2011/0261814 A1* | 10/2011 | Matthews | | H04L 47/28 |
| | | | | 370/389 |
| 2012/0259926 A1* | 10/2012 | Lockhart | | H04L 51/10 |
| | | | | 709/206 |
| 2014/0280838 A1* | 9/2014 | Finn | | H04L 49/00 |
| | | | | 709/223 |
| 2015/0271255 A1* | 9/2015 | Mackay | | H04L 47/6275 |
| | | | | 709/226 |
| 2016/0127150 A1* | 5/2016 | Qian | | H04L 47/125 |
| | | | | 370/477 |
| 2016/0142222 A1* | 5/2016 | Fang | | H04W 72/04 |
| | | | | 370/235 |
| 2017/0099161 A1* | 4/2017 | Liu | | H04L 12/64 |
| 2017/0150401 A1* | 5/2017 | Guo | | H04W 28/20 |
| 2017/0214626 A1* | 7/2017 | Dunlap | | H04W 48/20 |
| 2018/0351844 A1* | 12/2018 | Viox | | H04W 24/02 |
| 2018/0376401 A1* | 12/2018 | Karimli | | H04W 36/0022 |
| 2019/0097934 A1* | 3/2019 | Zhang | | H04L 47/122 |
| 2019/0190834 A1* | 6/2019 | Sung | | H04L 43/08 |
| 2019/0190835 A1* | 6/2019 | Sung | | H04L 47/2441 |
| 2019/0230027 A1* | 7/2019 | Murgia | | H04L 45/121 |
| 2019/0238468 A1* | 8/2019 | Kadel | | H04L 43/0852 |
| 2019/0260609 A1* | 8/2019 | Zhang | | H04L 47/125 |
| 2019/0306052 A1* | 10/2019 | Cheng | | H04L 45/123 |
| 2019/0342227 A1 | 11/2019 | Chen et al. | | |
| 2020/0077421 A1* | 3/2020 | Asterjadhi | | H04L 5/006 |
| 2020/0136977 A1* | 4/2020 | Chen | | H04L 43/0876 |
| 2020/0145345 A1* | 5/2020 | Finkelstein | | H04L 47/58 |
| 2020/0177311 A1* | 6/2020 | Ho | | H03M 13/05 |
| 2020/0314155 A1* | 10/2020 | Chiang | | H04L 1/1816 |
| 2020/0382243 A1* | 12/2020 | Li | | H04L 1/1685 |
| 2021/0099391 A1* | 4/2021 | Masputra | | H04L 47/805 |
| 2021/0100051 A1* | 4/2021 | Ho | | H04W 12/033 |
| 2021/0144589 A1 | 5/2021 | Seok et al. | | |
| 2021/0185747 A1* | 6/2021 | Kanamarlapudi | | H04L 1/08 |
| 2021/0211375 A1* | 7/2021 | Kwon | | H04W 72/535 |
| 2021/0274489 A1* | 9/2021 | Fang | | H04W 72/0446 |
| 2021/0314292 A1* | 10/2021 | Seok | | H04W 72/53 |
| 2021/0367881 A1* | 11/2021 | Bivans | | H04L 43/0811 |
| 2021/0377803 A1* | 12/2021 | Huang | | H04W 28/0925 |
| 2021/0409999 A1* | 12/2021 | Chilla | | H04L 12/4679 |
| 2021/0410016 A1* | 12/2021 | Kwok | | H04L 47/6215 |
| 2022/0132366 A1* | 4/2022 | Patel | | H04B 7/15528 |
| 2022/0150770 A1* | 5/2022 | Jo | | H04W 36/0069 |
| 2022/0158811 A1* | 5/2022 | Wang | | H04W 72/1268 |
| 2022/0159535 A1 | 5/2022 | Rahman | | |
| 2022/0159757 A1* | 5/2022 | Balasubramanian | | |
| | | | | H04L 5/0055 |
| 2022/0279383 A1* | 9/2022 | Amend | | H04W 28/082 |
| 2022/0329535 A1* | 10/2022 | Li | | H04L 47/2441 |
| 2022/0345247 A1* | 10/2022 | Guo | | H04L 1/188 |
| 2022/0393970 A1* | 12/2022 | Amend | | H04L 47/24 |
| 2023/0011377 A1* | 1/2023 | Niu | | H04W 72/02 |
| 2023/0070345 A1* | 3/2023 | Xu | | H04W 28/0865 |
| 2023/0084524 A1* | 3/2023 | Zhang | | H04L 1/189 |

\* cited by examiner

INTELLIGENT ROUTER BONDING 5G TELEPHONY AND DIGITAL SUBSCRIBER LINE SERVICES

PRIORITY CLAIM

This application is a continuation of U.S. patent application Ser. No. 17/126,931 filed on Dec. 18, 2020, which is incorporated herein by reference.

TECHNICAL FIELD

The following discussion generally relates to intelligent routing of data services to a home, business or similar customer premises. Various embodiments provide a router for intelligently allocating traffic between a digital subscriber line (DSL) service and a 5G mobile telephone service.

BACKGROUND

In recent years, access to digital data networks such as the Internet has expanded dramatically. Many people now rely on the Internet for their work, as well as their personal entertainment, news, communications, media and the like. Many different broadband services deliver high bandwidth network connectivity in many locations.

In other locations, however, high bandwidth connectivity is simply not available. Many rural customers, for example, may not have access to fiber optic or cable-based services. Often, digital subscriber line (DSL) services are available via hardwired telephone landlines, but these services are often limited in bandwidth. DSL services are presently limited to about 45 Mbps or so, and many services are as low as 3 or 5 Mbps. DSL service is known to degrade with distance to the service point, further limiting the bandwidth available to many customers, particularly those in rural areas.

As the demand for bandwidth increases, however, the limits of DSL become increasingly bothersome. Often, video streams transmitted across DSL connections suffer degradations in quality, or even stalls or similar interruptions. This problem is compounded if multiple users are simultaneously using the network, particularly if multiple media streams are being transported over the limited bandwidth. Due to the ever-increasing demands for more bandwidth, even 45 Mbps DSL service may be inadequate for many customers.

The shortcomings of DSL also create challenges for phone providers (ILECs) that rely upon legacy copper telephone infrastructure. These aging systems often compete at a substantial disadvantage with cable and fiber broadband operators that provide greater bandwidth and/or lower costs of service. As a result, many ILECs are reluctant to invest in aging DSL infrastructure. This compounds the problems of limited bandwidth and creates an even greater need for better network service for many customers, particularly rural customers that do not have access to quality cable or fiber based services.

It is therefore desirable to create devices, systems and processes to deliver improved network service to DSL subscribers. Other desirable features and characteristics will become apparent from the subsequent detailed description and the appended claims, taken in conjunction with the accompanying drawings and this background section.

BRIEF DESCRIPTION

Various embodiments relate to different automated processes, computing systems, devices and other aspects of a data processing system that provides intelligent routing between a DSL service and a 5G or similar wireless telephone service. By augmenting the DSL service with additional wireless bandwidth, the customer's quality of service and quality of experience can be greatly improved. Moreover, the relative advantages and disadvantages of DSL and 5G networks can be managed through intelligent routing of data packets between the two networks. A hybrid router device located at the customer premises therefore provides existing DSL customers with better bandwidth while retaining the guaranteed bandwidth of DSL service.

Various embodiments relate to systems, devices and/or automated processes executed by computing hardware. Several examples are described in detail here, and many additional embodiments are described within the more detailed description below.

Some example embodiments relate to an automated process to allocate user data traffic between a digital subscriber line (DSL) connection and a 5G wireless connection. The process is suitably executed by a router device or the like having a processor, memory or other digital data storage, hardware interfaces to one or more local area networks, and hardware interfaces to a digital subscriber line connection and to a 5G or similar wireless data connection. The automated process is typically stored in memory or other digital storage for execution by the processor. In one embodiment, the automated process performed by the router device suitably comprises: evaluating a current state of the DSL connection; evaluating a current state of the 5G wireless connection; receiving user data traffic via a local area network connection; and routing the user data traffic between the DSL connection and the 5G wireless connection based upon the current state of the DSL connection and the current state of the 5G wireless network.

Other embodiments provide a router device located in a home, office or other customer premises to allocate user data traffic between a digital subscriber line (DSL) connection from the router device to a network and a 5G wireless connection from the router device to the network. The router device suitably comprises: a digital processor; a first interface to a digital subscriber line (DSL) connection to a network; a second interface to a 5G wireless connection to the network; a third interface to a local area network; and a non-transitory digital storage configured to store computer executable instructions that are executable by the processor to perform an automated process as described herein. In one embodiment, the automated process suitably comprises: evaluating a current state of the DSL connection between the router device and the network; evaluating a current state of the 5G wireless connection between the router device and the network; receiving user data traffic via the local area network; selecting at least one of the DSL connection and the 5G wireless connection for the received user data traffic based upon the current state of the DSL connection and the current state of the 5G wireless connection; and redirecting the received user data traffic to the network via the selected at least one of the DSL connection and the 5G wireless connection.

This basic framework may be modified or augmented in many different ways. The routing may be based upon any number of different heuristics or rules, for example, to realize any number of different benefits. In many embodiments, the routing process uses the DSL connection if is available and when bandwidth and latency permits, but augments and/or replaces the DSL bandwidth with wireless bandwidth as conditions warrant. Other embodiments prioritize certain types of traffic that are bandwidth and/or latency sensitive so that the traffic is routed on the connection that provides the most efficient delivery and/or the best user experience. Other devices, systems and processes may be modified to achieve different objectives, as desired.

DRAWING FIGURES

DETAILED DESCRIPTION

Figure 1:
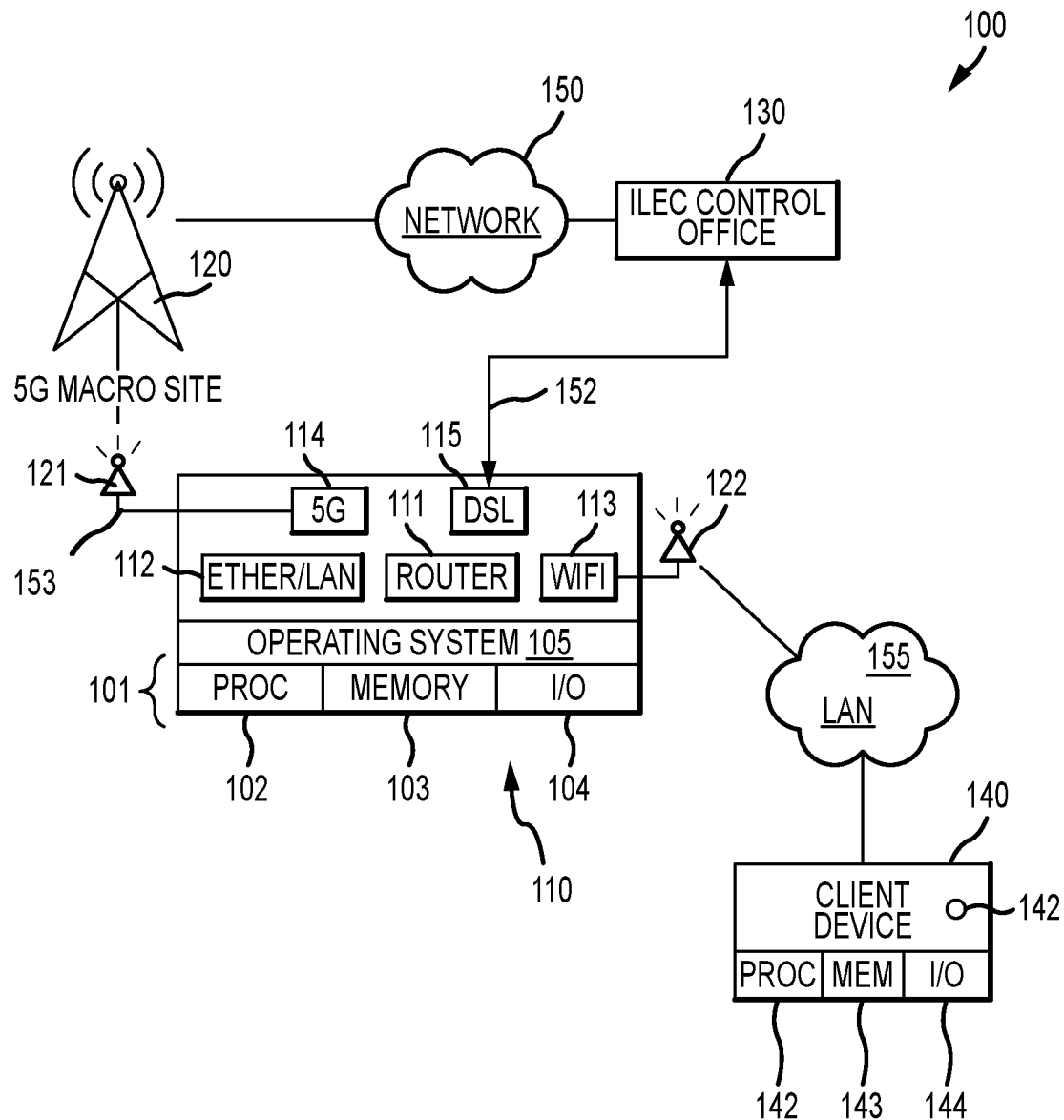
FIG. 1 illustrates an example of a system in which a router provides hybrid network access to a DSL service bonded with a 5G or similar wireless telephone service.

The following detailed description is intended to provide several examples that will illustrate the broader concepts that are set forth herein, but it is not intended to limit the invention or the application and uses of the invention. Furthermore, there is no intention to be bound by any theory presented in the preceding background or the following detailed description.

According to various embodiments, a hybrid 5G/DSL service provides an on-premises router device that monitors both wireless and wired data connections to provide optimized service using both connections. A 5G/DSL router can, for example, make convenient use of the "always available" bandwidth of a DSL connection to avoid overuse of more limited wireless bandwidth, while using wireless bandwidth as needed. When a customer account needs only limited bandwidth for, e.g., simple email, web browsing, home control and/or the like, the DSL service may provide sufficient capability without the need for wireless augmentation. But when the customer streams video, plays games and/or takes other actions that demand increased bandwidth and/or reduced latency, then additional wireless bandwidth can be used as appropriate. A bonded 5G/DSL service may be especially convenient for rural customers who may not have access to fiber or cable-based data services. Moreover, the 5G/DSL hybrid service may provide a cost effective option for customers who simply want to augment DSL service in limited situations (e.g., for occasional media streaming) rather than paying for "always-available" higher bandwidth connections that remain largely underutilized much of the time. A bonded DSL/5G system can provided redundancy in case either connection becomes unavailable due to malfunction, weather, maintenance and/or other factors. Many other use cases may be formulated, as desired.

Digital subscriber line (DSL) services are widely deployed in the US and elsewhere. Generally, DSL service is provided across a copper or other physical wire that is owned and operated by an incumbent local exchange carrier (ILEC) telephone service provider. Because landlines extend to most customers in the United States, access to DSL service is often readily available to rural customers even when cable and fiber based services are not available. DSL generally provides "always available" bandwidth across a dedicated connection. In contrast to cable-based broadband systems, data traffic from neighbors or other customers does not typically affect the bandwidth available from the dedicated DSL connection.

As mentioned above, however, DSL has several well-known shortcomings, including the relatively low bandwidth limits imposed by the dimensions of the copper wire and the physical distance to the ILEC exchange. Although DSL is substantially better than dial-up modem access, DSL does not (in many cases) provide sufficient bandwidth for high quality media streaming, particularly for multiple simultaneous media streams. A high quality (4K) video stream, for example, typically consumes about 15-25 Mbps of bandwidth. This roughly matches the full bandwidth available to many DSL subscribers. But even if the DSL connection is capable of supporting one high quality media stream, this can greatly reduce the quality of experience and capacity available for other users sharing the DSL connection. Multiple video streams may be unsustainable, and/or more immediate traffic (e.g., web browsing, gaming, messaging) may be impacted when the DSL connection is heavily used. In such cases other traffic may be delayed or even paused if the bandwidth is consumed for other purposes.

Augmenting a DSL connection with a wireless service, then, can be particularly helpful in relieving congestion and improving throughput in network communications. A 5G wireless telephone connection, for example, may provide an additional 50 Mbps or so of bandwidth, thereby more than doubling the bandwidth available from conventional DSL connections. (Of course other implementations could use different protocols having different bandwidth capabilities or other parameters.) As an added benefit, it can be beneficial to supplement wireless capabilities with hardwired data for increased reliability and improved location determination. Emergency data traffic (e.g., 911 phone calls), for example, can benefit from a hardwired connection that emanates from a known location and that is immediately available. Augmenting DSL with 5G wireless, then, can greatly improve the user experience, especially for rural customers or others where additional landline capability is inconvenient or unavailable.

One technical challenge that arises relates to routing customer data traffic between user devices and their intended network recipients over two or more simultaneous data connections. Traffic can be allocated between the two connections in any manner, but it may be desirable to manage the allocation in a more intelligent manner to make better use of the relative capabilities of the two connections, thereby improving the customer experience while making efficient use of network resources.

FIG. 1 illustrates one example of a system 100 in which a data router 110 located at customer premises is able to receive data traffic from a customer device 140 and to route the received traffic to the Internet or a similar network 150 via either a DSL connection 152 or a 5G wireless connection 153.

Router 110 is a hardware device that is physically located at a home, business or other customer premises to provide connectivity to network 150 for one or more customer devices 140. As illustrated in FIG. 1, router 110 includes physical hardware 101 including a processor 102, memory or other non-transitory data storage 103 and hardware interfaces 104 for input/output, electrical power and the like. In particular, router 110 typically includes hardware interfaces 103 to a local area network 155, a DSL data connection 152 and a 5G or similar wireless telephone connection 153. The hardware 101 operates under the control of an operating system 105 that allows various software applications 106 to access the physical features of the device 110. Generally, operating system 105 is a multitasking, multi-threaded operating system such as any version of the LINUX operating system, although any version of UNIX, WINDOWS, MacOS, iOS, Android and/or the like could be equivalently used in any number of other embodiments. Some embodiments may be implemented using "system on a chip (SoC)"

architectures that provide integrated processor 102, memory 103 and input/output support using one or more specialized circuit boards or integrated circuits, as desired. Other embodiments may make use of multiple processors or other components, and/or may make use of remote processing through various "cloud-based" services (e.g., Amazon Web Services, Microsoft Azure, Google Cloud Services and/or the like).

FIG. 1 illustrates router 110 as executing software or firmware routines 111, 112, 113, 114, 115 that typically reside in memory, solid state or magnetic storage, or any other programmable and non-transitory storage 103 for execution by processor 102. Each routine 111-115 may be implemented with separate programs, applets or other programming routines, as desired. The various functions and routines 111-115 shown in FIG. 1 may be replaced, supplemented and/or otherwise modified as desired for a wide array of equivalent embodiments.

Router module 111 suitably controls the routing of traffic between LAN 155 and network 150 using the DSL connection 152 and 5G wireless connection 153. Various embodiments are configured through software, firmware or other logic to route traffic according to any number of different rules and heuristics, several of which are described herein. Traffic may be routed on DSL connection 152 until bandwidth becomes limited, for example, and then excess traffic can be routed on the wireless connection 153 as needed. Other techniques may consider then-current conditions on connections 152 and 153 to better allocate traffic for a better user experience, and/or to make more efficient use of network resources. Latency-sensitive traffic (e.g., gaming, remote control, interactive messaging or browsing) may be routed toward whichever connection 152 or 153 has lower latency at that moment. Similarly, bandwidth sensitive traffic (e.g., media streaming) may be routed toward the connection 152 or 153 that has more then-current capability. Quality of service (QoS) routing techniques may be applied as appropriate. Additional detail about an example routing process is described with respect to FIG. 2 below, and a wide array of equivalent embodiments could create additional and/or alternate constraints, rules and routing preferences as desired.

User data traffic arrives at router 110 in any manner. In various embodiments, traffic is initially transmitted from a computer, phone, tablet, media streaming device, video game player, home control device and/or other consumer-type appliance represented simply as "user device 140" in FIG. 1. User device 140 typically includes a processor 142, memory or other non-transitory storage 143 and appropriate hardware interfaces 144 for input/output or the like. User device 140 generally executes one or more programs 142 to generate data traffic on LAN 155. Programs 142 may include media streaming applications, web browsers, communications programs (e.g., mail, messaging, social media and/or the like), home or office control programs, remote desktop applications and/or any number of other applications that use networks 155 and/or 150 for data communications with one or more remotely located server devices.

Router device 110 receives user data traffic generated by one or more user devices 140 via LAN 150. LAN 150 may be a wired network (e.g., IEEE 802.3 or the like), a wireless network (e.g., IEEE 802.11 or the like), a hybrid network, and/or any other network as desired. To that end, FIG. 1 illustrates router 110 as including modules 112, 113 to work with hardwired LANs and wireless LANs, respectively. Other embodiments may only support wired LANs or wireless LANs. Further embodiments may support multiple LANs 155, including any number of wired and wireless networks operating according to any standard or non-standard protocols. Communications with wireless LANs 155 will typically occur via an appropriate antenna 122.

Router 110 operates as a network router that securely and efficiently routes data packets between networks 150 and 155 using bonded data connections 152 and 153. Generally speaking, devices 140 operating on network 155 will have one or more network addresses such as a media access control (MAC) address for LAN communications, as well as an internet protocol (IP) or similar address for communicating via wide area networks such as network 150. Router 110 will generally assign a port number or the like to each device 140 desiring communications with WAN 150. Although FIG. 1 shows router device 110 as providing an access point for LAN 155, other embodiments may implement this function with a separate device in communication with router device 110 via a hardwired interface, or as otherwise appropriate.

FIG. 1 also shows router 110 as including a module 115 for establishing and maintaining DSL connection 152. Typically, DSL connection 152 is established to an ILEC central office 130 that is associated with a telephone service provider, and DSL connection 152 typically persists over time while the router 110 is active. That is, DSL connection 152 is generally established when the router 110 is powered up, and the connection 152 persists for such time as the router 110 remains active. DSL module 115 typically provides an interface between router module 111 and a hardware DSL interface 104, as appropriate. To that end, DSL module 115 typically controls the transmission and receipt of traffic across the DSL interface and conjunction with router module 111.

Router 110 also includes a 5G wireless module 114 that controls wireless communications via connection 153. Communications are typically exchanged between device 110 and a 5G macro site 120 within range of the device 110 via antenna 121. In various embodiments, 5G antenna 121 may be physically combined with antenna 122 to form a hybrid antenna that also supports communications with LAN 155 or the like.

5G wireless connection 153 may, in some implementations, be established as a persistent connection to reduce latency associated with subsequent connectivity. In other embodiments, the wireless connection 153 may be established on a more "as needed" basis, particularly if wireless access is charged on an incremental basis (e.g., by connection time, or by bandwidth actually used). In the latter case, connection 153 may not be maintained at all times, but rather only established on an "as needed" basis, e.g., when bandwidth needs exceed the capabilities of DSL connection 152.

In operation, then, router 110 suitably receives data communications packets from one or more user devices 140 via LAN 155 that are intended for services that are reachable through WAN 150. Router 110 retransmits the received user data via either of a DSL connection 152 or a 5G wireless connection 153. The particular connection 152 or 153 used for a particular data packet may be determined in any manner.

Figure 2:
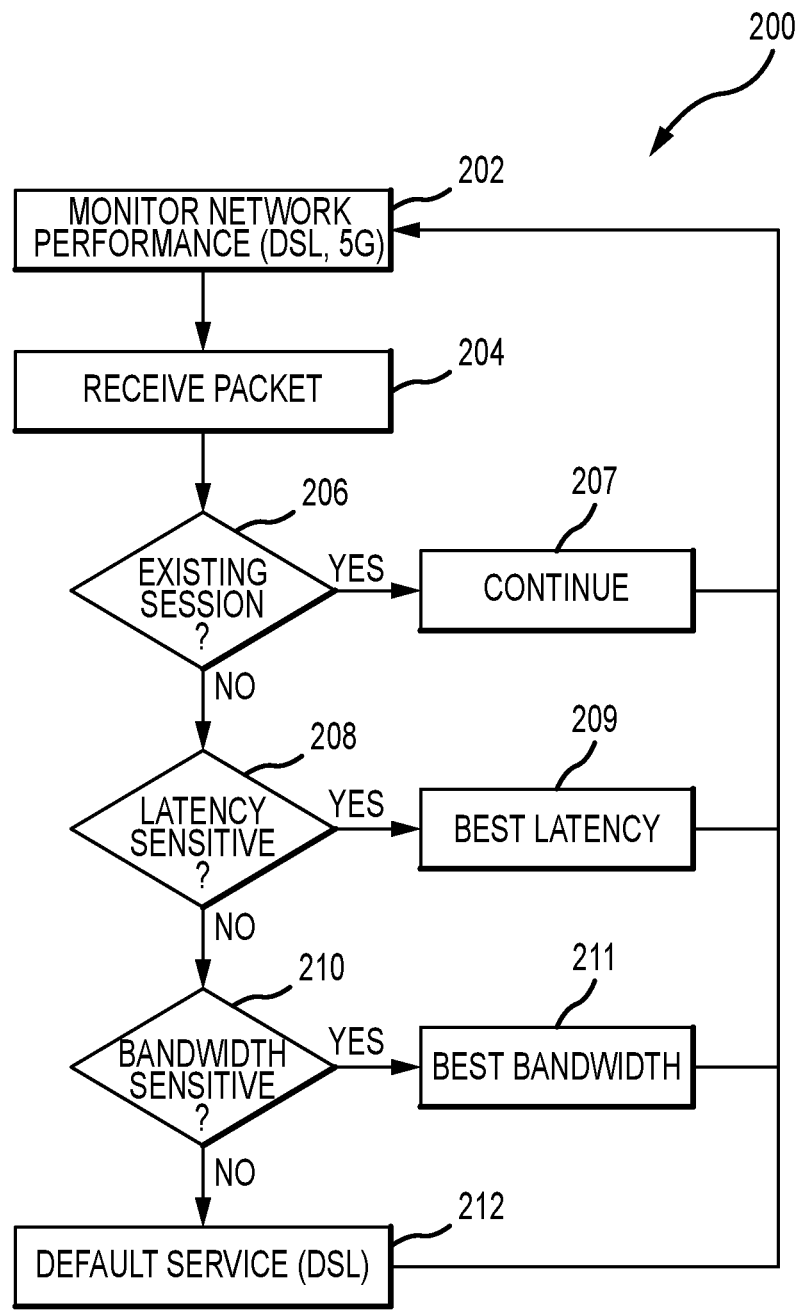
FIG. 2 is a diagram showing one example of an automated process executed by a router device to perform intelligent routing between DSL and 5G telephone services.

FIG. 2 illustrates an example process 200 to route received user traffic between a DSL connection 152 and a 5G wireless connection 153. Generally speaking, the various functions shown in FIG. 2 may be carried out in processing hardware 101 (e.g., one or more processors 102) residing within router 110. Typically, the various functions are carried out by the processor 102 executing software or firmware logic 111 in any format that is stored in memory 103 or other non-transitory storage prior to execution. Equivalent embodiments may modify the various functions and messages shown in FIG. 2 in any manner.

As shown in FIG. 2, an example process 200 for routing user data between a DSL connection 152 and a 5G wireless connection 153 suitably includes the broad steps of monitoring then-current network performance (function 202), and routing received user data (function 204) based upon service availability and/or the applicability of current conditions to the types of traffic received. Various embodiments may consider, for example, pre-existing sessions (functions 206, 207), latency sensitivity (functions 208, 209), bandwidth sensitivity (functions 210, 211) and/or the like. Some implementations could default to DSL service 152 when conditions allow (function 212) to make efficient use of the "always available" bandwidth, to facilitate emergency communications, and/or for other purposes. Various embodiments could perform additional quality of service (QoS) evaluations as desired, and/or may operate in any other manner.

Network performance may be monitored in any manner (function 202). In some implementations, router 110 generates test traffic on DSL connection 152 and on 5G wireless connection 153 to ensure accurate measurement of then-current performance in real time (or very near real time, recognizing some delays inherent in data communications and processing). Test traffic could include, for example, PING packets sent to one or more known addresses to ascertain transit times, which are directly indicative of latency and indirectly indicative of bandwidth. Other test traffic could include file transfers of relatively small files using file transfer protocol (FTP) or the like to more directly measure bandwidth. Still other embodiments could use SpeedTest or similar services, as desired.

Equivalent embodiments could augment or replace in situ test data with data derived from ILEC 130, from 5G service provider 120 and/or from any other network source as desired. In one example implementation, ILEC 130 maintains detailed network analysis data relating to their telephony network, and may also have access to 5G data from provider 120. In this instance, ILEC 130 pushes then-current performance data to router 110 via connection 152 on any regular or irregular basis, or as requested from router 110 from time to time. Any combination of in situ data obtained from router 110 and network data obtained from ILEC 130 or the like may be used. Again, it is highly desirable to obtain data in real time, or as near to real time as possible, because network conditions can change from moment-to-moment, and it is desirable to make routing decisions based upon current information.

Various embodiments may be configured to immediately select one of the available connections 152, 153 whenever the other connection is unavailable. If DSL connection 152 were to go down due to weather, maintenance or other factors, then traffic could immediately fall over to the 5G connection, and vice versa. This provides a level of redundancy and backup that would not be otherwise available, thereby improving the reliability and security of system 100. This redundancy may be particularly useful during natural disasters, inclement weather and/or similar conditions where the reliability of connections 152, 153 may be challenged, and the potential need for emergency communications is increased.

If both data connections 152 and 153 are available, then various embodiments use intelligent routing to direct traffic toward one connection and/or the other as desired. When user data packets are received by router device 110 (function 204), the packets may be retransmitted via either DSL connection 152 and/or 5G wireless connection 153 according to any routing algorithm or technique. As mentioned above, it is generally desirable to make efficient use of network resources while providing the best possible experience for the user in view of then-current network conditions. To that end, the current network conditions can be very helpful in allocating user traffic between the two connections 152 and 153.

Generally speaking, it will be desirable to maintain previously-established connections between a client device 140 and a service operating on network 155 (function 206). If a client device 140 has previously established a TCP session with a server on network 155, for example, it will typically be desirable to maintain the session (function 207) by transmitting traffic on the same connection 152 or 153 that was used previously. TCP sessions can be recognized by evaluating TCP header data in the received data packet and by maintaining an appropriate routing table with router module 111 that tracks the various sessions that are currently active.

In some instances, sessions may be established by incoming traffic via connection 152 or 153. If an incoming connection is requested via the DSL connection 152, for example, it may be beneficial to direct reply traffic on the same connection. Conversely, incoming requests on 5G wireless connection 153 may be serviced via the same connection 153.

For new traffic, connections may be assigned according to any technique. Certain types of traffic may benefit greatly from intelligent assignment to a connection 152, 153 having preferred then-current conditions. If incoming user traffic is particularly latency sensitive (function 208), for example, then it may be desirable to assign the traffic to the connection 152, 153 having the lower latency at that moment (function 209). Video gaming, video calls, voice calls, remote control applications, web browsing, messaging and/or the like are generally known to be latency sensitive, so assigning these types of data to lower latency connections can be beneficial. Low latency traffic may be recognized based upon analysis of TCP/IP headers, based upon source or destination port numbers, and/or based upon other factors as desired. To that end, various embodiments recognize latency sensitive traffic and redirect that traffic toward the connection 152, 153 having the better then-current latency data. Other embodiments may recognize latency threshold values that, when met on a connection 152 or 153, cause latency-sensitive traffic to be redirected toward the other connection.

Latency may be evaluated in any manner. As noted above, latency may be directly measured with PING packets or the like. Alternately, latency can be determined from packet loss, packet jitter, packet reordering and/or any other metric. Typically, if the latency is deemed to meet a relevant threshold on one of the connections 152 or 153, then certain types of traffic may be re-routed to the other lower latency connection.

Often, one-way latency of about 50 ms or round-trip latency of about 100 ms is expected for voice traffic, although other types of traffic (e.g., gaming, web browsing, messaging, control applications) may benefit from lower latency. Other applications (e.g., video streaming, electronic mail) may be less latency sensitive. The particular threshold values may therefore vary from embodiment to embodiment, and from application to application.

Similarly, bandwidth sensitive traffic may be identified (function 210) and routed over the connection 152, 153 having the best then-current bandwidth availability (function 211). Media streaming, for example, can be bandwidth sensitive, particularly for high quality video streams (e.g., 4K or 5K video). Media streaming is not, however, typically sensitive to latency, since a delay of a few seconds or so in a movie, television program or other media stream is often acceptable. Control of media streaming, on the other hand, is typically highly sensitive to latency without requiring substantial amounts of bandwidth. It may therefore be desirable, in some instances, to separately consider a control connection associated with a media stream since the stream itself may affect latency on the connection 152, 153 used to deliver that stream.

As with latency, bandwidth may be evaluated in any manner Various embodiments will redirect bandwidth sensitive traffic (e.g., media streaming) when the available bandwidth drops below an acceptable threshold. A 4K or 5K video stream, for example, will typically expect about 15-25 Mbps of bandwidth, which may be more than the entire bandwidth available via a DSL connection 152. Lower quality video streams, however, may operate well with less bandwidth. Thresholds may therefore vary from embodiment to embodiment and from application to application.

Similarly, bandwidth sensitive traffic may be redirected in any manner. Various embodiments will default to one connection (e.g., DSL connection 152) until a bandwidth threshold is met, at which time subsequent traffic is redirected on the other connection. Other embodiments may identify the current network traffic that is most bandwidth sensitive so that higher bandwidth traffic is isolated on one connection or the other. A high quality video stream, for example, may be redirected to a 5G connection 153 even if sufficient bandwidth exists on the DSL connection 152 in order to preserve bandwidth for other traffic, as desired.

In some implementations, it can be difficult to predict which connection 152, 153 will have better bandwidth or latency measurements at any particular time. Typical DSL bandwidth of 15-50 Mbps may be more or less than the currently available 5G bandwidth, which can be dependent upon many factors including an amount of traffic generated by other users of the same 5G bandwidth. Basing routing decisions upon recently-obtained data measurements can therefore provide substantial improvement in the user experience.

There may be instances, however, when default decisions can be made (function 212) based upon the type of the traffic, operating preferences, and/or other factors. As noted above, it may be desirable to route emergency messages (e.g., 911 calls) across the readily available DSL connection, which is typically registered to a physical address that can be easily provided to emergency responders or the like. In other situations, it may be most efficient to maximize the "always available" bandwidth of the DSL connection before using more expensive 5G wireless bandwidth. This is particularly true in pricing models that charge for 5G bandwidth on a time or other consumption basis. In such cases, it may be helpful to limit the 5G traffic to times when DSL-only bandwidth provides an undesirable user experience, such as during media streaming, gaming or the like.

Bonding a 5G wireless connection 153 to a DSL connection 152 can provide any number of benefits. Redundancy in bandwidth, for example, can provide security and convenience to the user, particularly for emergency communications. Intelligent routing between connections 152 and 153 can make efficient use of limited bandwidth resources by using the "always available" dedicated bandwidth of the DSL connection for regular traffic, while augmenting with wireless resources as needed to support higher bandwidth, lower latency or other demands. Occasional media streaming, for example, can make use of the excess 5G bandwidth when needed while preserving the DSL bandwidth for other traffic, as appropriate. Further, the bonded arrangement allows emergency traffic to be routed to the DSL connection for accurate location detection, to the wireless connection for faster delivery, or to both connections simultaneously if desired. Many other benefits and features of a bonded 5G/DSL system may be provided in any number of alternate but equivalent embodiments.

The general concepts described herein could be expanded in any number of ways to address any other issues arising in the context of a bonded DSL/5G network service. Although the operating environment is often described herein as a "home" environment, for example, equivalent concepts could be applied to offices, schools, factories, farms, restaurants and bars, and/or any number of other environments that make use of multiple network services. Moreover, the concepts described herein with respect to contacting video streaming could be equivalently applied for other applications or purposes such as web browsing, video gaming, home or office control, email or other communications, file or print sharing and/or any other applications as desired.

"Meeting" a threshold as used herein refers to a measured value being compared to a predetermined value. Equivalent embodiments may use any number of different "equal to", "greater than", "less than", "greater than or equal to", "less than or equal to" or similar logical constructs to indicate that a threshold has been "met".

The term "exemplary" is used herein to represent one example, instance or illustration that may have any number of alternates. Any implementation described herein as "exemplary" should not necessarily be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

The invention claimed is:

1. An automated process executed by a router device to allocate a user data traffic between a digital subscriber line (DSL) connection from the router device to a network and a 5G wireless connection from the router device to the network, the automated process comprising:
evaluating a current state of the DSL connection between the router device and the network;
evaluating a current state of the 5G wireless connection between the router device and the network, wherein the current state of the DSL connection comprises a first measurement of a performance-related condition of the DSL connection and wherein the current state of the 5G wireless connection comprises a second measurement of the performance-related condition of the 5G wireless connection;
receiving the user data traffic via a local area network connection;
selecting at least one of the DSL connection or the 5G wireless connection for the received user data traffic based upon the current state of the DSL connection and the current state of the 5G wireless connection, wherein the selecting comprises:

determining, based on a characteristic of a packet of the user data traffic, the received user data traffic is sensitive to the performance-related condition;

determining, after the steps of evaluating the current state of the DSL connection and evaluating the current state of the 5G wireless connection, which of the DSL connection and the 5G wireless connection has a better performance-related condition based on the first measurement and the second measurement; and assigning the user data traffic to the DSL connection or the 5G wireless connection having the better performance-related condition; and transmitting the received user data traffic to the network via the selected at least one of the DSL connection or the 5G wireless connection.

2. The automated process of claim 1 wherein the user data traffic is determined to be sensitive to at least one selected from the group of latency and bandwidth, and the better performance-related condition comprises a respective lower latency or a higher bandwidth.

3. The automated process of claim 1 wherein the user data traffic is determined to be sensitive to a quality of service (QOS), and evaluating a current state of the 5G wireless connection comprises evaluating a QoS of the 5G wireless connection, and evaluating a current state of the DSL connection comprises evaluating a QoS of the DSL connection.

4. The automated process of claim 1, wherein evaluating the current state of the DSL connection comprises transmitting a test traffic via the DSL connection and evaluating the current state of the 5G wireless connection comprises transmitting the test traffic via the 5G wireless connection.

5. The automated process of claim 4, wherein:
transmitting the test traffic comprises sending at least one test packet to at least one known network address;
evaluating the current state of the 5G wireless connection comprises determining a first transit time of the at least one test packet transmitted via the 5G wireless connection; and
evaluating the current state of the DSL connection comprises determining a second transit time of the at least one test packet transmitted via the DSL connection.

6. The automated process of claim 5, wherein:
evaluating the current state of the 5G wireless connection comprises determining, based on the determined first transit time, at least one selected from the group of a first latency and a first bandwidth of the 5G wireless connection; and
evaluating the current state of the DSL connection comprises determining, based on the determined second transit time, at least one selected from the group of a second latency and a second bandwidth of the DSL connection.

7. The automated process of claim 4, wherein:
transmitting the test traffic comprises sending at least one file to at least one known network address;
evaluating the current state of the 5G wireless connection comprises measuring a first bandwidth of the 5G wireless connection based on the transmitted at least one file; and
evaluating the current state of the DSL connection comprises measuring a second bandwidth of the DSL connection based on the transmitted at least one file.

8. The automated process of claim 7, wherein at least some of the received user data traffic is transmitted to the network via the 5G wireless connection when the measured second bandwidth of the DSL connection meets a threshold level.

9. The automated process of claim 1, wherein the characteristic of the packet of the user data traffic comprises at least one selected from the group of TCP/IP header data, source port number, and destination port number of the packet of the user data traffic.

10. The automated process of claim 1, wherein determining the received user data traffic is sensitive to the performance-related condition comprises identifying, based on the packet of the user data traffic, that the user data traffic is at least one selected from the group of video game traffic, video call traffic, voice call traffic, remote control application traffic, web browsing traffic, and messaging traffic.

11. The automated process of claim 1, wherein evaluating the current state of the DSL connection and evaluating the current state of the 5G wireless connection comprises receiving a network status data via the DSL connection, wherein the network status data describes the condition of the DSL connection and the condition of the 5G wireless connection.

12. A router device, comprising:
a digital processor;
a first interface to a DSL connection to a network;
a second interface to a 5G wireless connection to the network;
a third interface to a local area network; and
a non-transitory digital storage configured to store computer executable instructions that, when executed, cause the processor to perform an automated process comprising:
evaluating a current state of the DSL connection between the router device and the network;
evaluating a current state of the 5G wireless connection between the router device and the network, wherein the current state of the DSL connection comprises a first measurement of a performance-related condition of the DSL connection and wherein the current state of the 5G wireless connection comprises a second measurement of the performance-related condition of the 5G wireless connection;
receiving a user data traffic via the third interface to the local area network;
selecting at least one of the DSL connection or the 5G wireless connection for the received user data traffic based upon the current state of the DSL connection and the current state of the 5G wireless connection, wherein the selecting comprises:
determining, based on a characteristic of a packet of the user data traffic, the received user data traffic is sensitive to the performance-related condition;
determining, after the steps of evaluating the current state of the DSL connection and evaluating the current state of the 5G wireless connection, which of the DSL connection and the 5G wireless connection has a better performance-related condition based on the first measurement and the second measurement; and
assigning the user data traffic to the DSL connection or the 5G wireless connection having the better performance-related condition; and
transmitting the received user data traffic to the network via the selected at least one of the DSL connection or the 5G wireless connection.

13. The router device of claim 12 wherein the user data traffic is determined to be sensitive to at least one selected from the group of latency and bandwidth, and the better performance-related condition comprises a respective lower latency or a higher bandwidth.

14. The router device of claim 12 wherein the user data traffic is determined to be sensitive to a quality of service (QOS), and evaluating a current state of the 5G wireless connection comprises evaluating a QoS of the 5G wireless connection, and evaluating a current state of the DSL connection comprises evaluating a QoS of the DSL connection.

15. The router device of claim 12, wherein evaluating the current state of the DSL connection comprises transmitting a test traffic via the DSL connection and evaluating the current state of the 5G wireless connection comprises transmitting the test traffic via the 5G wireless connection.

16. The router device of claim 15, wherein:
transmitting the test traffic comprises sending at least one test packet to at least one known network address;
evaluating the current state of the 5G wireless connection comprises determining a first transit time of the at least one test packet transmitted via the 5G wireless connection; and
evaluating the current state of the DSL connection comprises determining a second transit time of the at least one test packet transmitted via the DSL connection.

17. The router device of claim 16, wherein:
evaluating the current state of the 5G wireless connection comprises determining, based on the determined first transit time, at least one selected from the group of a first latency and a first bandwidth of the 5G wireless connection; and
evaluating the current state of the DSL connection comprises determining, based on the determined second transit time, at least one selected from the group of a second latency and a second bandwidth of the DSL connection.

18. The router device of claim 15, wherein:
transmitting the test traffic comprises sending at least one file to at least one known network address;
evaluating the current state of the 5G wireless connection comprises measuring a first bandwidth of the 5G wireless connection based on the transmitted at least one file; and
evaluating the current state of the DSL connection comprises measuring a second bandwidth of the DSL connection based on the transmitted at least one file.

19. The router device of claim 12, wherein the characteristic of the packet of the user data traffic comprises at least one selected from the group of TCP/IP header data, source port number, and destination port number of the packet of the user data traffic.

20. The router device of claim 12, wherein evaluating the current state of the DSL connection and evaluating the current state of the 5G wireless connection comprises receiving a network status data via the DSL connection, wherein the network status data describes the condition of the DSL connection and the condition of the 5G wireless connection.

* * * * *